(12) United States Patent
Plank et al.

(10) Patent No.: US 11,789,150 B2
(45) Date of Patent: Oct. 17, 2023

(54) LOCALIZATION APPARATUS AND METHOD

(71) Applicant: Infineon Technologies AG, Neubiberg (DE)

(72) Inventors: Hannes Plank, Graz (AT); Norbert Druml, Graz (AT); Theresa Egger, Graz (AT); Thomas Herndl, Biedermannsdorf (AT); Christoph Steffan, Graz (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 17/825,245

(22) Filed: May 26, 2022

(65) Prior Publication Data

US 2022/0283306 A1 Sep. 8, 2022

Related U.S. Application Data

(62) Division of application No. 16/204,149, filed on Nov. 29, 2018, now Pat. No. 11,346,947.

(30) Foreign Application Priority Data

Nov. 30, 2017 (DE) .......................... 102017128369.2

(51) Int. Cl.
  *G01S 17/48* (2006.01)
  *G01S 17/88* (2006.01)
  *G01S 17/42* (2006.01)
(52) U.S. Cl.
  CPC .............. *G01S 17/48* (2013.01); *G01S 17/42* (2013.01); *G01S 17/88* (2013.01)

(58) Field of Classification Search
  CPC ................................ G01S 17/48; G01S 17/42
  See application file for complete search history.

(56) References Cited

U.S. PATENT DOCUMENTS

| 4,820,041 A | 4/1989 | Davidson et al. |
| 6,388,755 B1 | 5/2002 | Zhao et al. |
| 9,869,767 B2 | 1/2018 | Tsuji et al. |

(Continued)

FOREIGN PATENT DOCUMENTS

EP 0992814 A2 4/2000

*Primary Examiner* — Sang H Nguyen
(74) *Attorney, Agent, or Firm* — Murphy, Bilak & Homiller, PLLC

(57) ABSTRACT

A localization apparatus includes: a time-of-flight circuit configured to emit a first modulated light signal and to receive reflections of the first modulated light signal from at least three devices; a processing circuit configured to determine, based on the first modulated light signal and the reflections, positions of the at least three devices in a first coordinate system associated with the apparatus; and a receive circuit configured to receive second modulated signals from the at least three devices, the second modulated signals including data indicating positions of the at least three devices in a second coordinate system. The processing circuit is further configured to determine a position and orientation of the apparatus in the second coordinate system based on the positions of the at least three devices in the first coordinate system and the data indicating the positions of the at least three devices in the second coordinate system.

10 Claims, 4 Drawing Sheets

(56) References Cited

U.S. PATENT DOCUMENTS

| | | |
|---|---|---|
| 2006/0000967 A1* | 1/2006 | Kuijk .................... G01S 7/4868 |
| | | 250/221 |
| 2006/0023203 A1 | 2/2006 | Gatsios et al. |
| 2009/0079955 A1* | 3/2009 | Tsunesada ............ G01S 17/894 |
| | | 356/4.01 |
| 2009/0245788 A1 | 10/2009 | Varshneya et al. |
| 2011/0058153 A1 | 3/2011 | Van et al. |
| 2012/0120199 A1 | 5/2012 | Ben |
| 2013/0116977 A1 | 5/2013 | Godbaz et al. |
| 2014/0028804 A1 | 1/2014 | Usuda et al. |
| 2014/0049783 A1* | 2/2014 | Royo Royo .......... G01S 7/4816 |
| | | 250/208.2 |
| 2015/0241562 A1 | 8/2015 | Goldberg et al. |
| 2016/0086318 A1* | 3/2016 | Hannuksela ............ G01S 17/86 |
| | | 348/43 |
| 2016/0295193 A1 | 10/2016 | Van Nieuwenhove et al. |
| 2017/0363741 A1 | 12/2017 | Send et al. |
| 2018/0052231 A1 | 2/2018 | Cho et al. |
| 2018/0366504 A1 | 12/2018 | Jin |

\* cited by examiner

LOCALIZATION APPARATUS AND METHOD

TECHNICAL FIELD

The present disclosure relates to localization and communication using Time of Flight (ToF) modules. In particular, examples relate to an apparatus and a method for localizing a first device, a localization apparatus and methods for localization.

BACKGROUND

In many fields (e.g. Internet of Things, IoT, smart homes, or Wireless Sensor Networks, WSN), location-awareness for embedded devices is desired or even crucial. Such small electronic devices however are usually impaired of determining their location due to restrictions in size and cost. Conventional positioning techniques using Radio Frequency (RF), sound or magnetic positioning suffer from severely limited accuracy and range.

Similarly, the association of stationary electronic devices with geometric positions is problematic. Even if the expected positions are known, it can be labor-intensive to manually determine which device is located at which position.

Further, the complexity of 3D motion tracking and indoor positioning is problematic. Devices in the fields of industrial automation, autonomous robotics, and augmented/virtual reality currently use complex systems for positioning. This hinders the development of ubiquitous location-aware devices. Conventional systems, e.g., user combinations of ToF sensors, wide-angle, motion tracking cameras, inertial sensors and a dedicated computer vision processor. This yields to a complex system with high cost and excessive power consumption as well as space requirements.

Hence, there may be a demand for improved localization.

SUMMARY

The demand may be satisfied by examples described herein.

An example relates to an apparatus for localizing a first device. The apparatus comprises a ToF circuit configured to emit a first modulated light signal and to receive a reflection of the first modulated light signal from the first device. Further, the apparatus comprises a processing circuit configured to determine, based on the first modulated light signal and the reflection, a position of the first device in a first coordinate system associated with the apparatus. The processing circuit is further configured to determine a position of the first device in a second coordinate system based on the position of the first device in the first coordinate system, a position of the apparatus in the second coordinate system, and an orientation of the apparatus in the second coordinate system. The apparatus further comprises a transmit circuit configured to emit a second modulated signal to the first device, wherein the second modulated signal comprises data indicating the position of the first device in the second coordinate system. The second modulated signal may be a light signal generated from the same circuit emitting the first modulated light signal. In some embodiments, the second modulated signal may be emitted from a circuit separate from the circuit emitting the first modulated signal. For example, a wireless channel may be used to emit the second modulated signal.

Another example relates to a localization apparatus. The apparatus comprises a ToF circuit configured to emit a first modulated light signal and to receive reflections of the first modulated light signal from at least three devices. Further, the apparatus comprises a processing circuit configured to determine, based on the first modulated light signal and the reflections, positions of the at least three devices in a first coordinate system associated with the apparatus. The apparatus further comprises a receive circuit configured to receive second modulated signals from the at least three devices, wherein the second modulated signals comprise data indicating positions of the at least three devices in a second coordinate system. The processing circuit is further configured to determine a position and an orientation of the apparatus in the second coordinate system based on the positions of the at least three devices in the first coordinate system and the data indicating the positions of the at least three devices in the second coordinate system.

A further example relates to a method for localizing a first device. The method comprises emitting a first modulated light signal, and receiving a reflection of the first modulated light signal from the first device. Further, the method comprises determining, based on the first modulated light signal and the reflection, a position of the first device in a first coordinate system associated with an emitter of the first modulated light signal. The method additionally comprises determining a position of the first device in a second coordinate system based on the position of the first device in the first coordinate system, a position of the emitter in the second coordinate system, and an orientation of the emitter in the second coordinate system. Also, the method comprises emitting a second modulated signal to the first device, wherein the second modulated signal comprises data indicating the position of the first device in the second coordinate system.

Still another example relates to a localization method. The method comprises emitting a first modulated light signal, and receiving reflections of the first modulated light signal from at least three devices. Further, the method comprises determining, based on the first modulated light signal and the reflections, positions of the at least three devices in a first coordinate system associated with an emitter of the first modulated light signal. The method also comprises receiving second modulated signals from the at least three devices, wherein the second modulated signals comprise data indicating positions of the at least three devices in a second coordinate system. Additionally, the method comprises determining a position and an orientation of the emitter in the second coordinate system based on the positions of the at least three devices in the first coordinate system and the data indicating the positions of the at least three devices in the second coordinate system.

A further example relates to another localization method. The method comprises determining, based on an emitted first modulated light signal and received reflections of the first modulated light signal from a plurality of devices, first positions of the plurality of devices relative to an emitter of the first modulated light signal. Further, the method comprises emitting at least one second modulated signal to the plurality of devices that comprises data indicating the first positions of the plurality of devices. The method also comprises determining, based on an emitted third modulated light signal and received reflections of the third modulated light signal from at least three of the plurality of devices, second positions of the at least three of the plurality of devices relative to the emitter. Additionally, the method comprises receiving fourth modulated signals from the at least three of the plurality of devices, the fourth modulated signals comprising data indicating the first positions of the at least three of the plurality of devices. Further, the method comprises determining a relative movement of the emitter based on the first positions and the second positions of the at least three of the plurality of devices.

Those skilled in the art will recognize additional features and advantages upon reading the following detailed description, and upon viewing the accompanying drawings.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B. An alternative wording for the same combinations is "at least one of A and B". The same applies for combinations of more than 2 Elements.

The terminology used herein for the purpose of describing particular examples is not intended to be limiting for further examples. Whenever a singular form such as "a", "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises", "comprising", "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1:
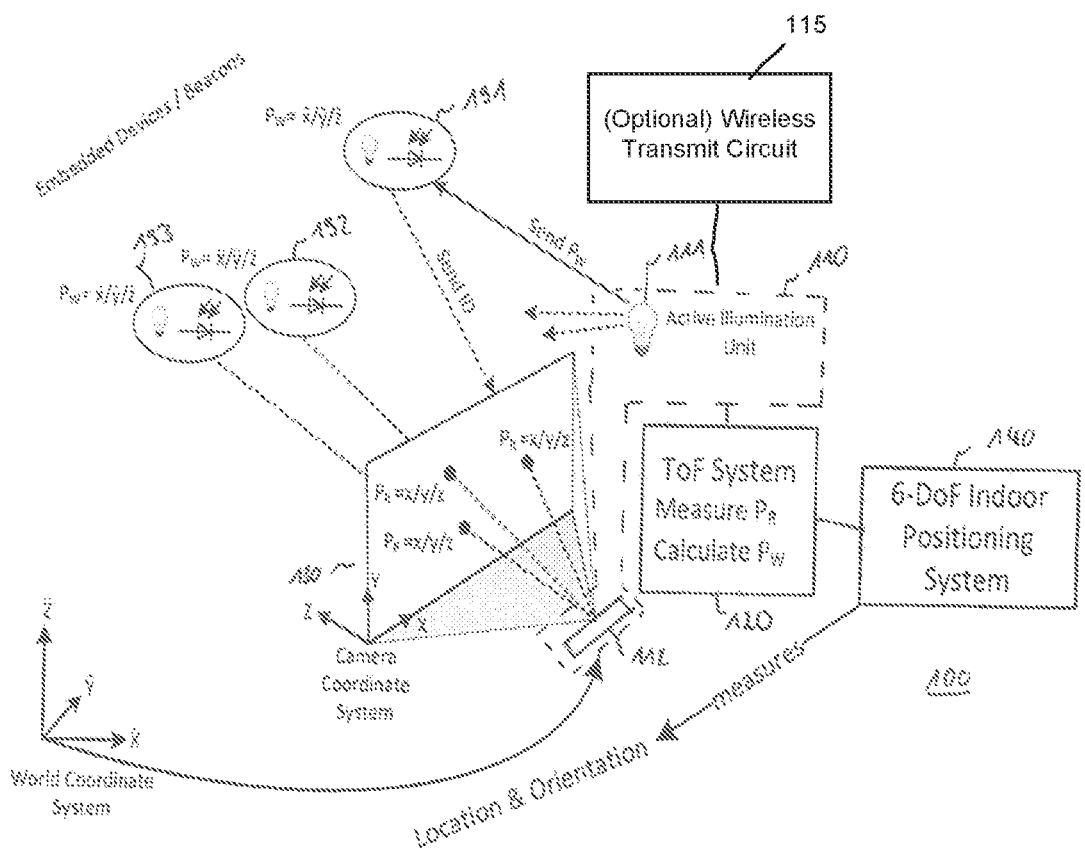
FIG. 1 illustrates an example of an apparatus for localizing a first device.

FIG. 1 illustrates an apparatus 100 for localizing a first device 191 (and optionally a second device 192, a third device 193 and further devices). For example, first device 191 may be an embedded device or a beacon. As indicated in FIG. 1, first device 191 may be configured to receive and/or emit modulated light signals. The first device 191 may, hence, comprise a photodetector (e.g. a photodiode, a solar cell, etc.) for receiving modulated light signals, and an integrated circuit (e.g. a microcontroller) for decoding the modulated light signals. Further, first device 191 may comprise a light source (e.g. Light Emitting Diode, LED, a Vertical-Cavity Surface-Emitting Laser, VCSEL, etc. together with a clock generation and a phase-shifting circuit) or a modulated retroreflector for emitting modulated light signals. The first device 191 may comprise further electronic and/or mechanical components (e.g. for sensing a physical quantity).

Apparatus 100 comprises a ToF circuit 110 that comprises a light source 111 configured to generate modulated light signals. Further, ToF circuit 110 comprises a photodetector 112 (e.g. comprising an array of photosensitive pixels) configured to receive modulated light signals. As indicated in FIG. 1, apparatus 100 may further comprise an optical system 130 (e.g. comprising one or more lenses) configured to project incoming light signals onto photodetector 112. ToF circuit 110 is configured to emit a first modulated light signal and to receive a reflection of the first modulated light signal from the first device.

Further, apparatus 100 comprises a processing circuit 120 configured to determine, based on the first modulated light signal and the reflection, a (three dimensional) position $P_R$ of the first device 191 in a first coordinate system associated with apparatus 100. In other words, apparatus 100 may be ToF camera. As indicated in FIG. 1, the first coordinate system may be spanned by three orthogonal axes X, Y and Z. The first coordinate system may, hence, be understood as a camera coordinate system denoting a position of the first device 191 relative to apparatus 100. For example, processing circuit 120 may be configured to determine a distance from apparatus 100 to the first device 191 based on the first modulated light signal and the reflection. Further, processing circuit 120 may be configured to determine an angle of arrival of the reflection, and determine the position $P_R$ of the first device 191 in the first coordinate system based on the distance and the angle of arrival.

Processing circuit 120 is further configured to determine a position $P_W$ of the first device 191 in a second coordinate system based on the position $P_R$ of the first device 191 in the first coordinate system, a position of apparatus 100 in the second coordinate system, and an orientation of apparatus 100 in the second coordinate system. The second coordinate system is spanned by three further orthogonal axes $\tilde{X}$, $\tilde{Y}$ and $\tilde{Z}$ in the example of FIG. 2. The further orthogonal axes $\tilde{X}$, $\tilde{Y}$ and $\tilde{Z}$ of the second coordinate system may be translated and rotated with respect to the orthogonal axes X, Y and Z of the first coordinate system. The second coordinate system may in general be any coordinate system of interest. For example, the second coordinate system may be a coordinate system having a reference which is independent of the reference of the first coordinate system. In other words, when elements move with respect to the first coordinate system, the movement of the elements in the second coordinate system is determined by a mapping from the first to the second coordinate system, e.g. a rigid transformation.

The second coordinate system may be denoted to a global coordinate system, or a coordinate system denoting the position in a dedicated area (e.g. in a building or a room). In other words, the first coordinate system is not practical for determining the position of objects since the apparatus 100 which provides the base for the first coordinate system is likely to be movable while the second coordinating system provides a more practical information in view of the choosing of the reference. For example, the second coordinate system may be a coordinate system having a building or a room as reference.

Apparatus 100 may comprise a positioning circuit 140 configured to determine the position and the orientation of apparatus 100 in the second coordinate system. For example, positioning circuit 140 may use a 2D camera together with computer vision positioning, a Global Navigation Satellite System (GNSS), inertial sensors, magnetic field sensors and/or further sensors and positioning methods for determining the position and the orientation of apparatus 100 in the second coordinate system. Alternatively, apparatus 100 may comprises a receiver circuit (not illustrated) configured to (e.g. wirelessly, or optically as described herein) receive data indicating the position and the orientation of apparatus 100 in the second coordinate system. In some examples, apparatus 100 may be stationary. Accordingly, the position and the orientation of apparatus 100 in the second coordinate system may be programmed (coded) to apparatus 100.

For example, the position $P_W$ of the first device 191 in the second coordinate system may be determined by processing circuit 120 according to the following expression:

$$P_W = R \cdot R_R + P_{App} \qquad (1)$$

with R denoting a rotation matrix and $P_{app}$ denoting the position of apparatus 100 in the second coordinate system.

ToF circuit 110 is further configured to emit a second modulated light signal to the first device 191, wherein the second modulated light signal comprises data indicating the position of the first device 191 in the second coordinate system. For example, the second modulated light signal is modulated based on the data indicating the position of the first device 191 in the second coordinate system. In some examples, a phase shift-keying modulation scheme may be used by ToF circuit 110 for generating the second modulated light signal.

Apparatus 100 may allow to localize the first device 191 (i.e. determine its position in the second coordinate system) using TOE sensing and provide the first device with its coordinates in the second coordinate system using optical communication. Apparatus 100, hence, combines ToF depth measurements and optical communication to tell the first device 191 its position. Apparatus 100 does not require any further communication means (e.g. using RF signals) for informing the first device 191 about its position.

ToF circuit 110 may be further configured to receive, from the first device 191, a third modulated light signal comprising data indicating an identity of the first device 191. Accordingly, processing circuit 120 may be further configured to assign the identity of the first device 191 to the position of the first device 191 in the second coordinate system. In other words, apparatus 100 may further allow to identify the first device 191.

The optical communication between apparatus 100 and the first device 191 may further be used by apparatus 100 to distinguish the first device 191 from other devices or objects in the scene. For example, the ToF circuit 110 may be configured to capture at least a part of the scene comprising the first device 191 at first time instant. At the first time instant, the first device 191 emits a modulated light signal. Subsequently, the ToF circuit 110 may be configured to emit a further modulated light signal that comprises a command for the first device 191 to stop emitting its modulated light signal. Further, the ToF circuit 110 may be configured to again capture at least a part of the scene comprising the first device at a second time instant. The second time instant succeeds the emission of the further modulated light signal by the ToF circuit 110. At the second time instant, the first device 191 does not emit its modulated light signal anymore. Accordingly, the captured scene at the first time instant differs from the captured scene at the second time instant. In particular, the modulated light signal of first device 191 is present in the captured scene at the first time instant, whereas it is no longer present in the captured scene at the second time instant. The vacant area(s) in the captured scene at the second time instant therefore relate to the first device 191. The processing circuit 120 may, hence, determine the position of the first device 191 in the first coordinate system based on a comparison of the captured scene at the first time instant and the captured scene at the second time instant.

It is evident that the positions of the second device 192, the third device 193 and/or further devices may be determined in the same manner as described above for the first sensor device 191.

For example, apparatus 100 may allow to localize embedded devices using ToF sensing, and to provide the devices with their coordinates using optical communication.

Apparatus 100 may, hence, be understood as ToF camera usable for determining the positions of one or more embedded devices. The ToF system is able to derive relative 3D positions in its camera coordinate space (as an example for the first coordinate system), and is provided with its own position and orientation within a world coordinate system (as an example for the second coordinate system. The ToF camera may, e.g., be employed in conjunction with an additional positioning system.

As described above, the ToF camera system may uses distance measurements and the projected light source position to derive the relative positions $P_R$ of embedded devices. The ToF camera may, e.g., use an additional 6-degree-of-freedom localization system or its own positioning system to determine the orientation and rotation in the world coordinate system. This information can be expressed as the 3D position $P_{APP}$ in the reference world coordinate system (e.g. a building floorplan), and the rotation matrix R. This information may be used to determine the world position $P_W$ of the communication partner according to above expression (1).

The system with the ToF sensor can derive the identity of each visible communication partner, so that the world-position $P_W$ can then be associated with the identity of the communication partner as described above.

It is also possible to send the world positions to the other embedded devices. This enables to provide precise location awareness to a manifold of electronic devices. It is also possible to transmit the positions and identities of neighboring embedded devices. This may, e.g., allow forming efficient location and context-aware WSNs.

For example, one of the first modulated light signal and the second modulated light signal (data signal) emitted by ToF circuit 110 may comprise data indicating an identity and/or a position $P_W$ the second coordinate system of the second device 192 (or any other device). Accordingly, the first device 191 and/or the third device 193 (or any other device) may be informed about the identity and/or the position of the second device 192.

Data indicating the further devices may be communicated via optical communications to apparatus 100. For example, the ToF circuit 110 may be configured to receive from the second device 192 (or any other device) a fourth modulated light signal comprising data indicating the identity of the second device 192 prior to emitting one of the first and the second modulated signals.

Similarly, ToF circuit 110 may be further configured to emit a fifth modulated light signal (data signal) to second device 192 (or any other device) that comprises data indicating the identity and/or the position $P_W$ of the first device 191 in the second coordinate system. Accordingly, the second device 192 (or any other device) may be informed about the identity and/or the position $P_W$ of the first device 191.

Data indicating a specific device may further be transmitted by apparatus 100 on request of other devices. For example, ToF circuit 110 may be configured to emit the fifth modulated light signal in response to receiving a sixth modulated light signal from the second device 192 (or any other device) that comprises a request to transmit the data indicating the position $P_W$ of the first device 191 (or any other device) in the second coordinate system.

As described above, the ToF camera may use its (active) light source to transmit data, and its photodetector (e.g. a pixel array) to receive data. Since the incoming light is projected by one or more lenses of the optical system 130, it is further possible to determine the direction of the communication partner. Due to the lens projection of the communication partners, simultaneous communication between one ToF camera and multiple partners is possible.

That is, the ToF circuit 110 may, e.g., be configured to simultaneously receive the fourth modulated light signal and one of the third modulated light signal and the reflection. This is possible since the optical system projects, based on the position of the second device 192 relative to apparatus 100, the fourth modulated light signal onto a first region of photodetector 112, and projects, based on the position of the first device 191 relative to apparatus 100, the one of the third modulated light signal and the reflection onto a second region of photodetector 112.

Information to be transmitted by apparatus 100 may be modulated into a pause between ToF phase image capture. This pause is configurable because it is used to limit the frame rate during normal (i.e. ToF) operation. Since the illumination unit is only active when images are captured, it is possible to implement relative pulse position keying as modulation method. For example, the first modulated light signal and another modulated light signal are used for ToF depth measurement. Then, the second modulated light signal may be emitted by ToF circuit 110 during a pause between emitting the first modulated light signal and the other modulated light signal. As described above, the ToF circuit 110 may further be configured to generate the second modulated light signal (or other modulated light signals carrying information) according to a phase shift-keying modulation scheme.

Further, depth measurements may be embedded into the communication protocol user for the optical communication between apparatus 100 and the devices 191, 192 and 193. Accordingly, the apparatus 100 (i.e. the ToF camera) may measure the distance to one of the devices while transmitting information. For example, the first modulated light signal (or any other modulated light signal used for ToF measurements) may comprise information to be transmitted by apparatus 100. The first modulated light signal is, hence, not only for determining the position of the first device 191 in the first coordinate system but also for transmitting information from apparatus 100 to one or more of the devices 191, 192 and 193.

In the above example, it is assumed that the devices 191, 192 and 193 are stationary. However, in some examples, the devices 191, 192 and 193 or at least one thereof may be moveable. Accordingly, apparatus 100 may be used for tracking the movable devices 191, 192 and 193. As described above, the position and the orientation of apparatus 100 in the second coordinate system may be programmed (coded) to apparatus 100 (e.g. since apparatus 100 is stationary). Accordingly, apparatus 100 may determine the current positions of one or more of the devices 191, 192 and 193 using a ToF measurement and transmit the positions to the devices as described above.

While in the above description the communication from apparatus 100 to one or more of the devices 191, 192 and 193 is done via optical communication, some examples may alternatively use different communication methods for communication from apparatus 100 to one or more of the devices 191, 192 and 193. For example, apparatus 100 may comprise a circuit 115 for wireless transmission of information to one or more of the devices 191, 192 and 193. In other words, apparatus 100 may comprise a transmit circuit of any type for emitting modulated signals to one or more of the devices 191, 192 and 193. However, it is to be noted that in this example, the devices 191, 192, and 193 still transmit their respective information via optical communication to apparatus 100.

As described above, the proposed concept may allow to combine ToF depth measurements and optical communication to tell embedded electronics their position. The proposed concept may further allow to use localized devices in order to create a high-performance localization and motion tracking system. This is described in the following with reference to FIG. 2.

Figure 2:
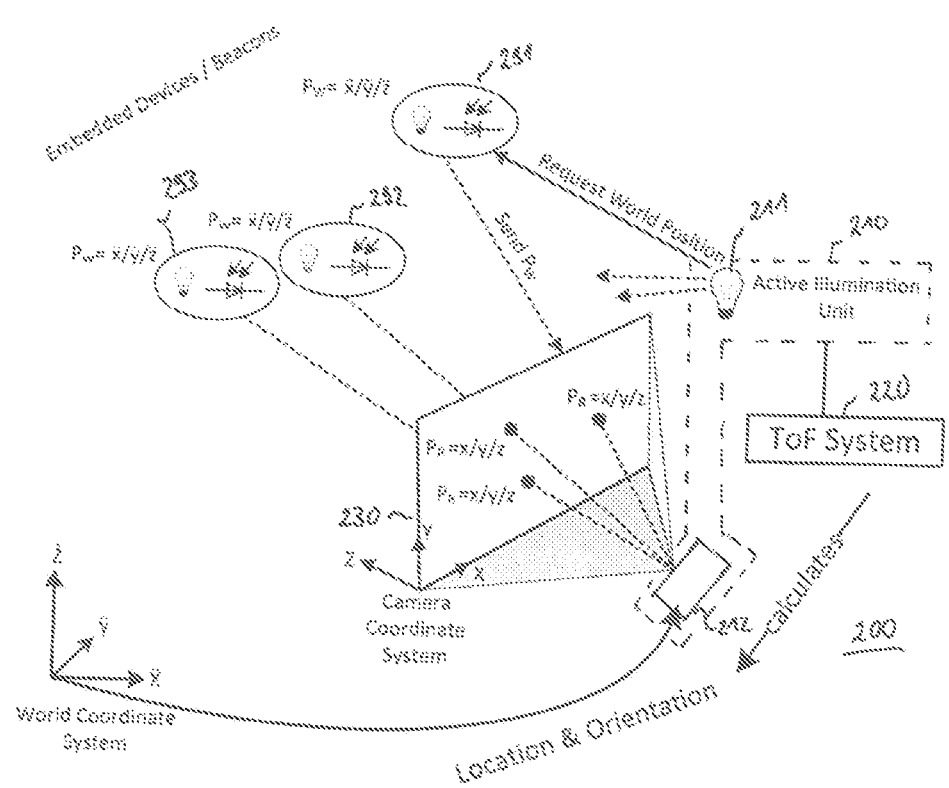
FIG. 2 illustrates an example of a localization apparatus.

FIG. 2 illustrates a localization apparatus 200 together with plurality of devices 291, 292 and 293 (further devices may be used optionally). Apparatus 200 comprises a ToF circuit 210 configured to emit a first modulated light signal and to receive reflections of the first modulated light signal from the at least three devices 291, 292 and 293. Like ToF circuit 110 described above, also ToF circuit 210 comprises a light source 211 and a photodetector 212. Further, apparatus 200 comprises an optical system 230. It is, hence, referred to the above description for the details of light source 211, photodetector 212 and optical system 230.

Further, apparatus 200 comprises a processing circuit 220 configured to determine, based on the first modulated light signal and the reflections, positions $P_R$ of the at least three devices 291, 292 and 293 in a first coordinate system associated with the apparatus. Again, apparatus 200 may be understood as a ToF camera. As indicated in FIG. 2, the first coordinate system may be spanned by three orthogonal axes X, Y and Z. The first coordinate system may, hence, be understood as a camera coordinate system denoting a position of the first devices 291, 292 and 293 relative to apparatus 200.

ToF circuit 210 is further configured to receive second modulated light signals from the at least three devices 291, 292, and 293. The second modulated light signals comprise data indicating positions $P_W$ of the at least three devices 291, 292 and 293 in a second coordinate system. The second coordinate system is spanned by three further orthogonal axes $\tilde{X}$, $\tilde{Y}$ and $\tilde{Z}$ in the example of FIG. 2. The further orthogonal axes $\tilde{X}$, $\tilde{Y}$ and $\tilde{Z}$ of the second coordinate system may be translated and rotated with respect to the orthogonal axes X, Y and Z of the first coordinate system. Again, the second coordinate system may in general be any coordinate system of interest. For example, second coordinate system may be a coordinate system denoting the absolute position in the world, or a coordinate system denoting the position in a dedicated area (e.g. in a building or a room). For example, the positions of the three devices 291, 292 and 293 in the second coordinate system may, e.g., be determined and transmitted to the devices prior as described above in connection with FIG. 1. In some examples, the data indicating the position $P_W$ of at least one of the at least three devices 291, 292 and 293 in the second coordinate system may (only) comprise data indicating the identity of the device. If the previously measured position of the device is stored by apparatus 200 (e.g. in a dedicated memory), the identity may be used by apparatus 200 to look up the position of the device in the memory. That is, the data indicating the position $P_W$ of one the at least three devices 291, 292 and 293 in the second coordinate system may be indirect information.

The second modulated light signals may be received in response to a request by apparatus 200. For example, the first modulated light signal may comprise a request to a receiver of the first modulated light signal to transmit data indicating its position in the second coordinate system to apparatus 200. Alternatively, the ToF circuit 210 may be configured to emit a third modulated light signal that comprises a request to a receiver of the third modulated light signal to transmit data indicating its position in the second coordinate system (and/or identity) to apparatus 200.

The processing circuit 220 is configured to determine a position and an orientation of apparatus 200 in the second coordinate system based on the positions $P_R$ of the at least three devices 291, 292 and 293 in the first coordinate system and the data indicating the $P_W$ of the at least three devices 291, 292 and 293 in the second coordinate system. For example, the position and the orientation of apparatus 200 may be determined by determining the rigid-transformation of the positions $P_R$ in the first coordinate system and the positions $P_W$ in the second coordinate system. That is, triangulation may be used for determining the position and the orientation of apparatus 200.

Apparatus 200 may allow to determine its position in the second coordinate system using only ToF measurements and optical communication. ToF cameras are able to capture images at high frame-rates (due to sensing an active light source). Accordingly, apparatus 200 may allow positioning and motion tracking at unprecedented update-rates (e.g. of more than 100 Hz-up to 500 Hz).

In other words, the proposed concept may allow an electronic device to accurately determine its position and orientation solely with a ToF sensor. As described above with more details, a system with a ToF sensor may use optical communication to contact location-aware embedded devices. Due to, e.g., previously conducted localization (see FIG. 1), these devices are aware of their location in the second (e.g. world) coordinates. As illustrated in FIG. 2, these devices may use the optical communication link to the ToF camera to transmit their position in world coordinates.

The proposed concept may, e.g., allow to deploy simple base-stations in areas of interest and solely use a ToF camera with optical communication for localization, Since ToF sensors are able to capture phase-images at high frame-rates, an unprecedented update-rate can be achieved. Along with the resulting low positioning latency, this may lead to an advantage compared to conventional optical positioning systems.

ToF sensors are also used in smartphones as front-facing camera for face tracking and device unlocking. According to the proposed concept, the ToF camera may be used for localization as well. This may be done by sensing beacons in the background of the front facing camera according to the principles described above in connection with FIG. 2. This may enable a system where a user can look on a smartphone screen and due to the localization and face-tracking, the phone knowns the exact position and the direction the user is facing. This may open the way for ubiquitous location-based services, such as interactive indoor navigation, location-based advertisements and general augmented reality applications Although the devices 291, 292 and 293 may be provided with their respective position as described above in connection with FIG. 1, at least some of them may alternatively be preprogrammed manually with their position in the second coordinate system. Once a ToF system uses them for localization, it is possible to determine the world positions of the remaining devices. In other words, processing circuit 220 may further be configured to determine, based on a fourth modulated light signal emitted by ToF circuit 210 and based on a reflection of the fourth modulated light signal received by ToF circuit 210 from a fourth device (not illustrated), a position of the fourth device in the first coordinate system. Based on the position and the orientation of apparatus 200 in the second coordinate system and the position of the fourth device in the first coordinate system, the processing circuit 220 may further be configured to determine the position of the fourth device in the second coordinate system. As described more detailed in connection with FIG. 1, ToF circuit 210 may be further configured to emit a fifth modulated light signal to the fourth device that comprises data indicating the position of the fourth device in the second coordinate system, Alternatively, just one ToF camera alone may be used to define the second (world) coordinate system. In this alternative, an initial 3D measurement of (all) visible devices is conducted. The resulting point cloud may either be mapped manually to a world coordinate system, or can be used to define the origin of a new world coordinate system. During this initial step, the positions relative to the origin are sent to all devices, which then serve as beacons. This variant may be particularly helpful for, e.g., head-mounted virtual reality devices, since it may allow relative motion tracking at a high update-rate.

In other words, processing circuit 220 may alternatively be configured to first determine, based on a first modulated light signal emitted by ToF circuit 210 and based on reflections of the first modulated light signal received by ToF circuit 210 from a plurality of devices, first positions of the plurality of devices relative to apparatus 200. Subsequently, ToF circuit 210 may be configured to emit at least one second modulated light signal to the plurality of devices that comprises data indicating the first positions of the plurality of devices. Further, processing circuit 220 may be configured to determine, based on a third modulated light signal emitted by ToF circuit 210 and based on reflections of the third modulated light signal received emitted by ToF circuit 210 from at least three of the plurality of devices, second positions of the at least three of plurality of devices relative to apparatus 200. Also, ToF circuit 210 may be further configured to receive fourth modulated light signals from the at least three of the plurality of devices, wherein the fourth modulated light signals comprise data indicating the first positions of the at least three of the plurality of devices. Accordingly, processing circuit 220 may be configured to determine a relative movement of apparatus 200 based on the first positions and the second positions of the at least three of the plurality of devices.

Also in this alternative, apparatus 200 may allow relative motion tracking at a high update-rate without the need for further any further external position or orientation determination. The proposed concept may, hence, facilitate indoor positioning and tracking by using location-aware optical communication based on ToF sensing.

Similar to the example of FIG. 1, any type of communication channel may be used for exchanging position information between apparatus 200 and the devices 291, 292 and 293. Alternatively to the optical communication described in connection with FIG. 2, wireless communication may, e.g., be used for exchanging position information. For example, apparatus 200 may comprises a circuit for wireless transmission/reception of information to/from the devices 291, 292 and 293. In other words, apparatus 200 may comprise a transmit/receive circuit of any type for emitting/receiving modulated signals to/from the devices 291, 292 and 293.

In order to summarize the above, flowcharts of methods for localization according to the proposed technique are described in the following with reference to FIGS. 3 to 5.

Figure 3:
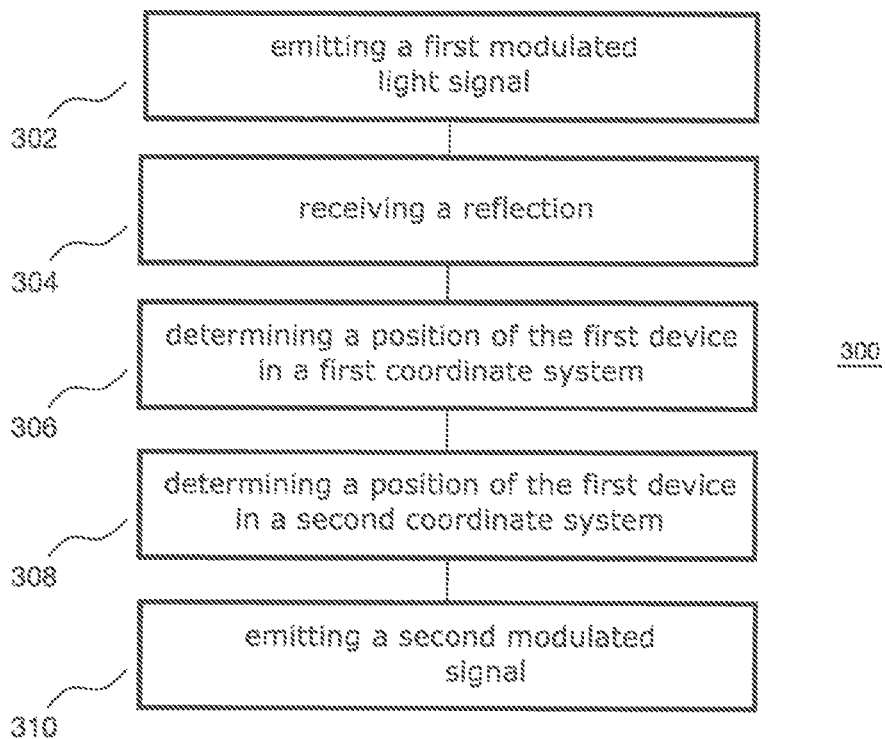
FIG. 3 illustrates a flowchart of an example of a method for localizing a first device.

An example of a method 300 for localizing a first device according to the proposed technique is illustrated in FIG. 3. Method 300 comprises emitting 302 a first modulated light signal a modulated continuous wave), and (simultaneously) receiving 304 a reflection of the first modulated light signal from the first device. Further, method 300 comprises determining 306, based on the first modulated light signal and the reflection, a position of the first device in a first coordinate system associated with an emitter of the first modulated light signal. Method 300 additionally comprises determining 308 a position of the first device in a second coordinate system based on the position of the first device in the first coordinate system, a position of the emitter in the second coordinate system, and an orientation of the emitter in the second coordinate system. Also, method 300 comprises emitting 310 a second modulated (light) signal to the first device, wherein the second modulated signal comprises data indicating the position of the first device in the second coordinate system.

Method 300 may, hence, allows to combine ToF sensing and optical communication to tell the first device (e.g. embedded electronics) its position.

As described above, method 300 may further comprise receiving, from the first device, a third modulated light signal comprising data indicating an identity of the first device, and assigning the identity of the first device to the position of the first device in the second coordinate system.

More details and aspects of method 300 are mentioned in connection with the proposed technique or one or more examples described above (e.g. FIG. 1), The method may comprise one or more additional optional features corresponding to one or more aspects of the proposed technique or one or more examples described above.

Figure 4:
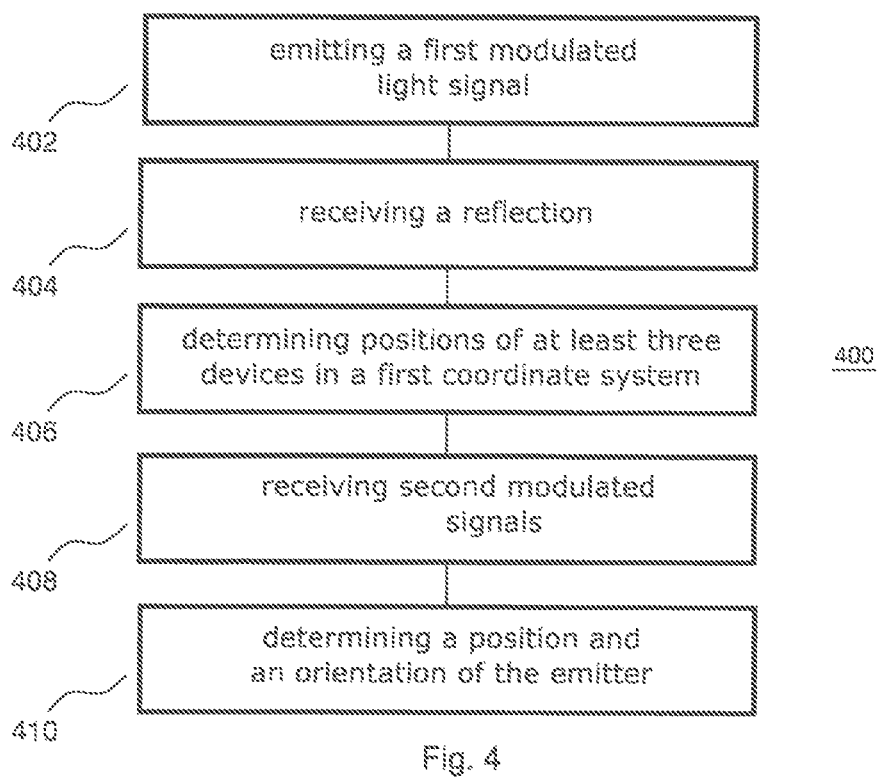
FIG. 4 illustrates a flowchart of an example of a localization method.

An example of a localization method 400 according to the proposed technique is illustrated in FIG. 4. Method 400 comprises emitting 402 a first modulated light signal (a modulated continuous wave), and (simultaneously) receiving 404 reflections of the first modulated light signal from at least three devices. Further, method 400 comprises determining 406, based on the first modulated light signal and the reflections, positions of the at least three devices in a first coordinate system associated with an emitter of the first modulated light signal. Method 400 also comprises receiving 408 second modulated (light) signals from the at least three devices, the second modulated (light) signals comprising data indicating positions of the at least three devices in a second coordinate system. Additionally, method 400 comprises determining 410 a position and an orientation of the emitter in the second coordinate system based on the positions of the at least three devices in the first coordinate system and the data indicating the positions of the at least three devices in the second coordinate system.

In some examples, the first modulated light signal may comprise a request to a receiver of the first modulated light signal to transmit data indicating its position in the second coordinate system to the emitter. Alternatively, method 400 may further comprise emitting a third modulated light signal comprising a request to a receiver of the third modulated light signal to transmit data indicating its position in the second coordinate system to the emitter.

More details and aspects of method 400 are mentioned in connection with the proposed technique or one or more examples described above (e.g. FIG. 2). The method may comprise one or more additional optional features corresponding to one or more aspects of the proposed technique or one or more examples described above.

Figure 5:
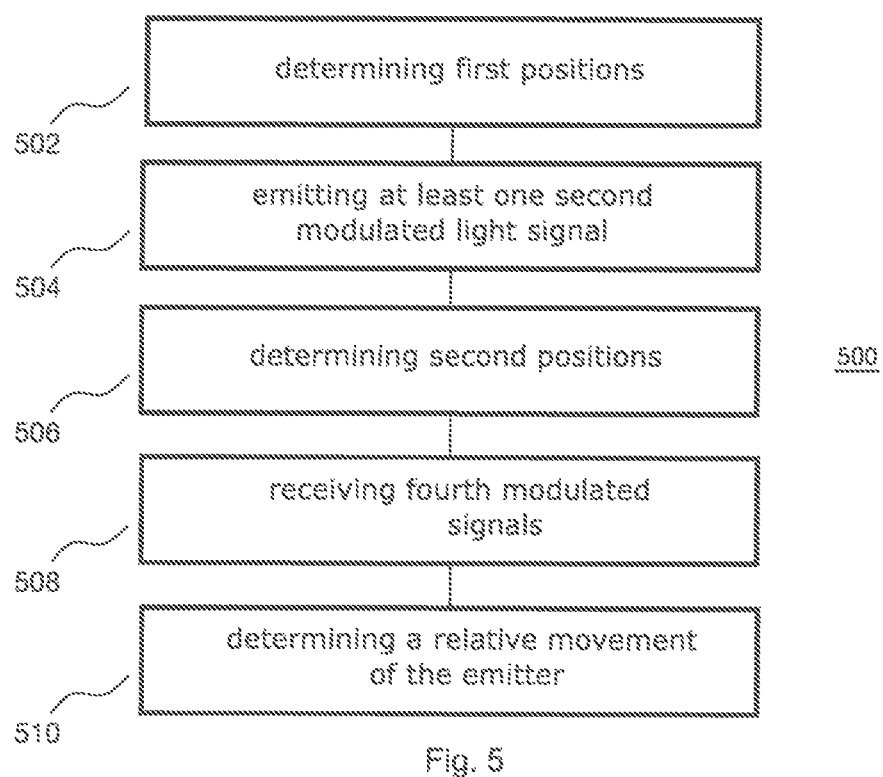
FIG. 5 illustrates a flowchart of an example of another localization method

Another localization method 500 according to the proposed technique is illustrated in FIG. 5. Method 500 comprises determining 502, based on an emitted first modulated light signal and received reflections of the first modulated light signal from a plurality of devices, first positions of the plurality of devices relative to an emitter of the first modulated light signal. Further, method 500 comprises emitting 504 at least one second modulated (light) signal to the plurality of devices that comprises data indicating the first positions of the plurality of devices. Method 500 also comprises determining 506, based on an emitted third modulated light signal and received reflections of the third modulated light signal from at least three of the plurality of devices, second positions of the at least three of the plurality of devices relative to the emitter. Additionally, method 500 comprises receiving 508 fourth modulated (light) signals from the at least three of the plurality of devices. The fourth modulated light signals comprise data indicating the first positions of the at least three of the plurality of devices. Further, method 500 comprises determining 510 a relative movement of the emitter based on the first positions and the second positions of the at least three of the plurality of devices.

More details and aspects of method 500 are mentioned in connection with the proposed technique or one or more examples described above (e.g. FIG. 2). The method may comprise one or more additional optional features corresponding to one or more aspects of the proposed technique or one or more examples described above.

Examples of the present disclosure, hence, relate to combining location-aware optical communication with indoor positioning. Since ToF sensors may communicate and determine the 3D position of embedded devices at the same time, the position and orientation of the ToF sensor may be combined with relative 3D ToF measurements to produce the 3D position of the embedded device in world coordinates. As described above, this procedure may also be used as base mechanism to establish a high-performance indoor positioning system.

The aspects and features mentioned and described together with one or more of the previously detailed examples and figures, may as well be combined with one or more of the other examples in order to replace a like feature of the other example or in order to additionally introduce the feature to the other example.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A localization apparatus, comprising:
    a time of flight circuit configured to emit a first modulated light signal and to receive reflections of the first modulated light signal from at least three devices;
    a processing circuit configured to determine, based on the first modulated light signal and the reflections, positions of the at least three devices in a first coordinate system associated with the localization apparatus; and
    a receiver circuit configured to receive second modulated signals from the at least three devices, the second modulated signals comprising data indicating positions of the at least three devices in a second coordinate system,
    wherein the processing circuit is further configured to determine a position and an orientation of the localization apparatus in the second coordinate system based on the positions of the at least three devices in the first coordinate system and the data indicating the positions of the at least three devices in the second coordinate system.

2. The localization apparatus of claim 1, wherein:
    the first modulated light signal comprises a request to a receiver of the first modulated light signal to transmit data indicating its position in the second coordinate system to the localization apparatus; or
    the time of flight circuit is further configured to emit a third modulated light signal that comprises a request to a receiver of the third modulated light signal to transmit data indicating its position in the second coordinate system to the localization apparatus.

3. The localization apparatus of claim 1, wherein the time of flight circuit comprises:
    a light source circuit configured to emit the first modulated light signal; and
    a photodetector circuit configured to receive the reflections of the first modulated light signal.

4. The localization apparatus of claim 1, wherein the processing circuit is further configured to:
    determine a distance from the localization apparatus to the at least three devices based on the first modulated light signal and the reflections;
    determine an angle of arrival of the reflections; and
    determine the position of the at least three devices in the first coordinate system based on the distance and the angle of arrival determined for each of the at least three devices.

5. The localization apparatus of claim 1, wherein the time of flight circuit is configured to receive, from the at least three devices, a third modulated light signal comprising data indicating an identity of the at least three devices, and wherein the processing circuit is further configured to assign the identity of the at least three devices to the position of each of the at least three devices in the second coordinate system.

6. The localization apparatus of claim 1, wherein one of the first modulated light signal and the second modulated signal further comprises data indicating an identity and a position in the second coordinate system of a second device.

7. The localization apparatus of claim 6, wherein the time of flight circuit is configured to receive, from the second device, a fourth modulated light signal comprising data indicating the identity of the second device.

8. The localization apparatus of claim 7, wherein the time of flight circuit is further configured to simultaneously receive the fourth modulated light signal and one of the third modulated light signal and the corresponding reflection.

9. A localization method, comprising:
    emitting a first modulated light signal;
    receiving reflections of the first modulated light signal from at least three devices;
    determining, based on the first modulated light signal and the reflections, positions of the at least three devices in a first coordinate system associated with an emitter of the first modulated light signal;
    receiving second modulated signals from the at least three devices, the second modulated signals comprising data indicating positions of the at least three devices in a second coordinate system; and
    determining a position and an orientation of the emitter in the second coordinate system based on the positions of the at least three devices in the first coordinate system and the data indicating the positions of the at least three devices in the second coordinate system.

10. The method of claim 9, wherein the first modulated light signal comprises a request to a receiver of the first modulated light signal to transmit data indicating its position in the second coordinate system to the emitter, or wherein the method further comprises emitting a third modulated light signal comprising a request to a receiver of the third modulated light signal to transmit data indicating its position in the second coordinate system to the emitter.

* * * * *